3,398,177
REDISTRIBUTION OF SiH BONDS
Howard Franklin Stewart, Midland, Mich., assignor to Dow Corning Corporation, Midland, Mich., a corporation of Michigan
No Drawing. Filed May 10, 1965, Ser. No. 454,663
10 Claims. (Cl. 260—448.2)

This application relates to the process of contacting at a temperature of 50° to 250° C. (a) a silicone reactant comprising at least one organosilicon compound selected from the group consisting of silanes, polysilanes, silcarbanes, and polysiloxanes, said silicone reactant containing (1) ≡SiH bonds where the silicon atoms so bonded are further bonded to no more than one atom selected from the group consisting of halogen and oxygen atoms, and (2) at least one type of bond selected from the group consisting of ≡SiCl, ≡SiR, and siloxane, where the silicon atoms participating in said bonds are each bonded to no more than two atoms selected from the group consisting of chlorine and oxygen atoms, where R is selected from the group consisting of aryl, alkaryl, and lower alkoxy, the other bonds in said silicone reactant consisting essentially of those selected from the group consisting of Si-monovalent aliphatic hydrocarbon, Si-monovalent cycloaliphatic hydrocarbon, Si-monovalent halohydrocarbon, Si-divalent hydrocarbon-Si, Si-divalent halohydrocarbon-Si, and Si-Si; with (b) an aluminum silicate selected from the group consisting of acidic aluminum phyllosilicates, and acidic aluminum silicates of zeolite structure having a port size sufficiently large to permit entry of said silicone reactant into said zeolite structure, whereby an exchange reaction occurs between said bonds (1) and (2).

The process of this invention is a useful tool for transforming one organosilicon compound into another by means of acid clay catalysts, which have the advantage of being readily separable from the reaction mixture.

Ingredient (a) can be any of one or more organosilicon compounds that contain the requisite bonds described above.

The material that makes up ingredient (a) must contain silicon-bonded organic radicals connected to the silicon by a ≡SiC≡ linkage, thereby preferably being an average of at least one organic group bonded to each silicon atom.

Examples of suitable monovalent aliphatic and cycloaliphatic hydrocarbon groups to which the silicon atoms can be bonded are alkyl and cycloalkyl radicals such as methyl, ethyl, isopropyl, sec-hexyl, octadecyl, and cyclohexyl; and aliphatically unsaturated radicals such as ethynyl, vinyl, allyl, 4-hexenyl, and cyclopentenyl.

Examples of monovalent halohydrocarbon radicals are haloalkyl and halocycloalkyl radicals such as 3,3,3-trifluoropropyl, 5-chlorohexyl, and dibromocyclopentyl; aliphatically unsaturated radicals such as 4-bromobutenyl-2 and trifluorocyclohexenyl; and aryl-containing radicals such as chlorophenyl, dibromophenyl, α,α,α-trifluorotolyl and iodoxenyl.

Examples of divalent hydrocarbon and halohydrocarbon radicals are methylene, hexamethylene,

—CH$_2$CH=CHCH$_2$— phenylene, xenylene, chlorophenylene, and tetrafluorophenylene.

R, defined above, can be any aryl or alkaryl radical such as phenyl, xenyl, tolyl, and m-ethylphenyl, or any lower alkoxy group such as methoxy, ethoxy, or isopropoxy.

Examples of suitable ingredients (a) are, therefore,

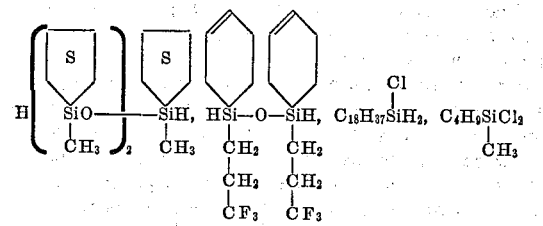

and

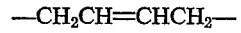

and

Further examples of ingredient (a) are shown below.

Ingredient (b) can be any acidic aluminum silicate as described above. An acidic aluminum silicate is one that can be titrated with alkali to yield a neutral mixture which is no longer catalytically active, but which can be reactivated by treatment with a strong acid such as HCl. The acid groups can be bound on the aluminum silicate as in natural clay. In that case an aqueous dispersion of the clay will be neutral to acid test paper. The acid groups can also be placed on the aluminum silicate by washing it in an aqueous inorganic acid solution. An aqueous dispersion of this will be acidic.

The phyllosilicates possess a sheet or platelike crystal structure, the most common genus of the group being the clay family. Many clays are naturally acidic; the others can be rendered acidic by acid-washing to remove the neutralizing alkali metal or alkaline earth cations.

Suitable clays for ingredient (b) are, for example, kaolinite, nacrite, halloysite, montmorillonite, bentonite, vermiculite, nontronite, illite, chlorite, and attapulgite.

Other suitable phyllosilicates are the micas which have been acid-treated to replace some of the alkali metal cations with hydrogen ions.

Further information concerning the phyllosilicates is available in The Encyclopedia of Chemical Technology, Interscience, New York (1959), vol. 12, pp. 288–292.

The zeolites consist primarily of aluminum silicate in a crystalline form of linked tetrahedral groups that form cagelike structures. These cages contain "ports," which are passages into the interior of the cagelike zeolite structure. A cation is found in each of these cages, the zeolite being acidic when the cation is a proton or a hydronium ion. The zeolites are hydrated.

Examples of operative zeolites are acidic forms of analcite, chabazite, natrolite, scolecite, mordenite, heulandite, and phillipsite.

Operative zeolites must have ports that are large enough to permit entry of the silicone reactant into the cage structure of the zeolite. The port size is the maximum width of openings into the zeolite structure, and it can be determined by theoretical means, or by attempting to react a silicone reactant of known size with an acidic zeolite of unknown port size. Failure to react in the manner described above is an indication that the port size is too small. Generally, the port size must be at least 5, and preferably at least 10 angstroms in order to accommodate the average silicone reactant.

Further information on aluminum silicates of zeolite structure is available in The Encyclopedia of Chemical Technology, ibid., pp. 295–298.

All of the above aluminum silicates can be enhanced in their acidity by washing them in solutions of aqueous strong inorganic acids such as HCl or $H_2SO_4$, or by other acid treatment, followed by heating.

Another of many sources of information about clay is Grim, Clay Minerology, McGraw-Hill, New York (1953).

Virtually no natural aluminum silicate exists in the pure form, and impurities in the aluminum silicate catalysts of this invention are not intended to place them outside of the scope of the claims below as long as they continue to operate in the manner described herein. Typical impurities are water, $Fe_2O_3$, FeO, MgO, CaO, $K_2O$, $Na_2O$, $TiO_2$, and organic materials.

It is preferred to operate the process of this invention at a temperature below 200° C.; the process of this invention is practically always operative at temperatures below that point.

The time of reaction varies with the temperature and the nature of the reactants involved, but rarely exceeds a few hours.

Other materials such as organic solvents and nonreactive organosilicon compounds can be present in the process of this application, if desired.

The redistribution of SiH bonds with the bonds of category (2) appears to be generally random in that all possible redistribution products are usually produced, but the yields of the products may vary with the reaction conditions, nature of the catalysts, etc.

The following examples are illustrative only, and should not be construed as limiting the invention, which is properly delineated in the appended claims.

Example 1

A quantity of

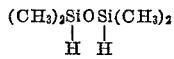

was heated at 58° to 73° C. in the presence of an $H_2SO_4$— treated bentonite-type clay which is sold under the name of Filtrol-13 for several hours. The following new products were formed: $(CH_3)_2SiH_2$ (gas) and compounds of the formula

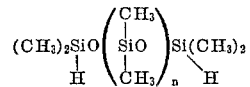

where $n$ has an average value of 129. Compounds where $n$ is 1 through 7 were isolated.

Example 2

(a) A quantity of

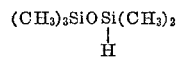

was heated at about 109° C. for several hours in the presence of the clay of Example 1.

The products $(CH_3)_2SiH_2$ (gas) and $$(CH_3)_3SiOSi(CH_3)_3$$

were recovered.

(b) A quantity of

was heated at about 109° C. for several hours in the presence of the clay of Example 1.

The products $(CH_3)_2SiH_2$ and

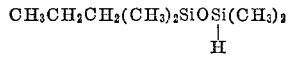

were recovered.

(c) The above experiment was repeated, using

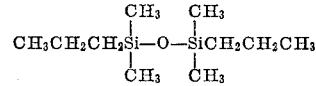

$CH_3SiH_3$ was recovered along with an undetermined number of other compounds, indicating that there had been a redistribution of ≡SiH,

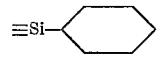

and siloxane bonds.

Example 3

A quantity of

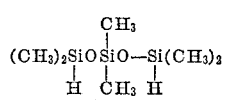

was heated at 83° C. in the presence of the clay of Example 1 for several hours.

The following new products were formed:

$$(CH_3)_2SiH_2$$

and

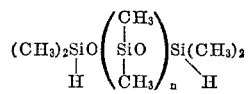

where $n$ is an integer of 3 to 40.

Example 4

A mixture of 0.34 g. of $(CH_3)_2SiH_2$ and 0.4 g. of

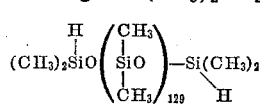

was heated at 110° C. in the presence of 0.04 g. of the clay of Example 1 under pressure for several hours.

The product

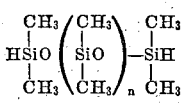

was formed, where $n$ had an average value of 15.6, but the presence of materials where $n$ is from 0 to 11 was also detected.

Example 5

A mixture of 0.2729 of $(CH_3)_2SiH_2$ and 0.305 g. of $(CH_3)_3SiOSi(CH_3)_3$ was heated at 110° C. in the presence 0.04 g. of the clay of Example 1 under pressure for several hours.

The products $(CH_3)_3SiH$,

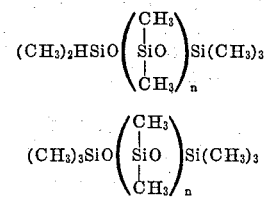

and

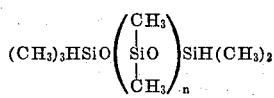

where $n$ has a value of 0 through 7, were identified.

Example 6

A mixture of $(CH_3)_2SiH_2$ and octamethylcyclotetrasiloxane was heated at 110° to 114° C. in the presence of the clay of Example 1 for several hours.

The product was

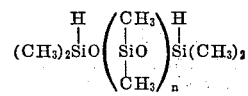

where $n$ has a value of 4 to 20.

Example 7

A quantity of phenyldimethylsilane was heated at 105° C. in the presence of the clay of Example 1 for several hours.

There was recovered a 27% yield of diphenyldimethylsilane and a 26% yield of dimethylsilane.

Example 8

A quantity of dimethylchlorosilane was heated at about 109° C. in the presence of the clay of Example 1 for several hours.

There was recovered a 19% yield of dimethyldichlorosilane and 19% yield of dimethylsilane.

When an equimolar mixture of dimethyldichlorosilane and dimethylsilane is treated as above, roughly a 60% yield of dimethylchlorosilane is recovered.

Example 9

A quantity of dimethylethoxysilane was heated at 104° C. in the presence of the clay of Example 1 for several hours.

Among the products were dimethylsilane and dimethyldiethoxysilane.

Example 10

A quantity of phenylmethylchlorosilane was heated at 63° to 115° C. in the presence of the clay of Example 1 for several hours.

There was recovered a 35% yield of methylsilane along with a substantial amount of phenylmethyldichlorosilane and diphenylmethylchlorosilane.

Example 11

Equimolar amounts of phenyldimethylsilane and diphenyldichlorosilane were heated at 145° to 150° C. in the presence of the clay of Example 1 for several hours.

The products included silane, dimethyldichlorosilane, dimethylsilane, triphenylchlorosilane, diphenylchlorosilane and diphenylsilane.

Example 12

Mixtures of 25 microliters of sym-tetramethyldisiloxane and 0.001 g. of one of the following catalysts were heated at 109° C. for 23 hours.

The product was analyzed for the presence of $(CH_3)_2SiH_2$ by gas-liquid chromatography.

The catalysts used, and the area percent of the recorded chromatographic peaks that pertained to $$(CH_3)_2SiH_2$$

are shown below. This latter figure relates to the yield of $(CH_3)_2SiH_2$ in a nonlinear manner, but a high area percent indicates a high yield.

| Catalyst: | Area percent of $(CH_3)_2SiH_2$ |
|---|---|
| (a) The clay of Example 1 | 77.0 |
| (b) A synthetic, acid-activated mordenite having a molecular sieve structure, and known as Zeolon H+ (Norton Chemical Co.) | 79.5 |
| (c) Colloidal, naturally acidic kaolin (Fisher chemical) | 89.6 |
| (d) Acid-washed kaolin | 66.4 |
| (e) An aluminum silicate of zeolite structure having an average cage size of 80 A. (Houdry S–46) | 34.6 |
| (f) Naturally acidic halloysite | 87.6 |
| (g) $H_2SO_4$—washed fuller's earth (containing attapulgite) | 79.6 |
| (h) Natural attapulgite | 6.0 |

Example 13

When sym-bis-3,3,3-trifluoropropylmethyldisiloxane is heated for 12 hours at 150° C. in the presence of powdered, acidic montmorillonite, the products 3,3,3-trifluoropropylmethylsilane and

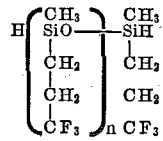

are formed, where $n$ has a value of 3 to 40.

Example 14

When

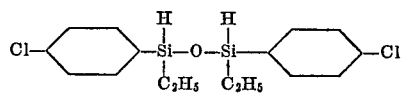

is heated for 12 hours at 150° C. in the presence of acidic halloysite, the following products are formed:

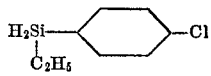

and

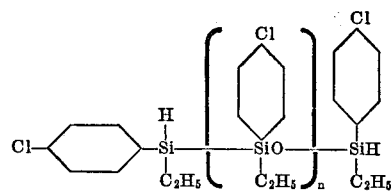

where $n$ has a value of 3 to 20.

Example 15

When 1 g. of

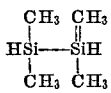

is heated with 1 g. of

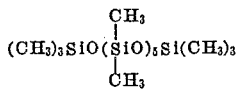

at 100° C. in the presence of natural, acidic halloysite, the products (CH$_3$)$_3$SiH and a poly(siloxanesilane) residue are formed.

Example 16

When 1 g. of

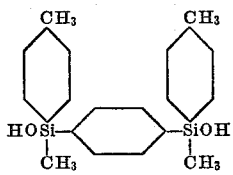

is reacted at 100° C. with 1 g. of

in the presence of an acidic, aluminum silicate zeolite having an average port size of 10 A., the products

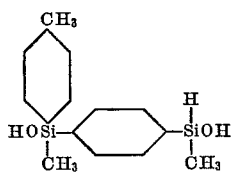

and

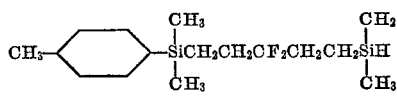

among others, are recovered.

That which is claimed is:

1. The process of contacting at a temperature of 50° to 250° C.
   (a) a silicone reactant comprising at least one organosilicon compound selected from the group consisting of silanes, polysilanes, and polysiloxanes, said silicone reactant containing
   (1) ≡SiH bonds where the silicon atoms so bonded are further bonded to no more than one atom selected from the group consisting of halogen and oxygen atoms, and
   (2) at least one type of bond selected from the group consisting of ≡SiCl, ≡SiR, and siloxane, where the silicon atoms participating in said bonds are each bonded to no more than two atoms selected from the group consisting of chlorine and oxygen atoms, where R is selected from the group consisting of aryl, alkaryl, and lower alkoxy, the other bonds in said silicone reactant consisting essentially of those selected from the group consisting of Si-monovalent aliphatic hydrocarbon, Si-monovalent cycloaliphatic hydrocarbon, Si-monovalent halo-hydrocarbon, Si-divalent hydrocarbon-Si, Si-divalent halohydrocarbon-Si, and Si-Si; with
   (b) an aluminum silicate selected from the group consisting of acidic aluminum phyllosilicates, and acidic aluminum silicates of zeolite structure having a port size sufficiently large to permit entry of said silicone reactant into the zeolite framework, whereby an exchange reaction occurs between said bonds (1) and (2).

2. The process of claim 1 where the silicon reactant contains ≡SiOSi≡ bonds.

3. The process of claim 1 where the silicone reactant contains ≡SiCl bonds.

4. The process of claim 1 where the silicone reactant contains ≡SiC$_6$H$_5$ bonds.

5. The process of claim 1 where the silicone reactant contains silicon-lower alkoxy bonds.

6. The process of claim 1 where (b) has a zeolite structure.

7. The process of claim 1 where (b) is a bentonite clay which has been treated with a strong inorganic acid.

8. The process of claim 1 where (b) is acidic kaolin.

9. The process of claim 1 where (b) is acidic halloysite.

10. The process of claim 1 where (b) is acidic montmorillonite.

References Cited

UNITED STATES PATENTS 2,717,257  9/1955  Bluestein _____ 260—448.2
3,346,349  10/1967  Harding et al. _____ 23—366 XR HELEN M. McCARTHY, *Primary Examiner.*

J. P. PODGORSKI, *Assistant Examiner.*